Dec. 26, 1950 J. F. DAWSON 2,535,905
DEEP FAT FRIER
Filed April 30, 1946
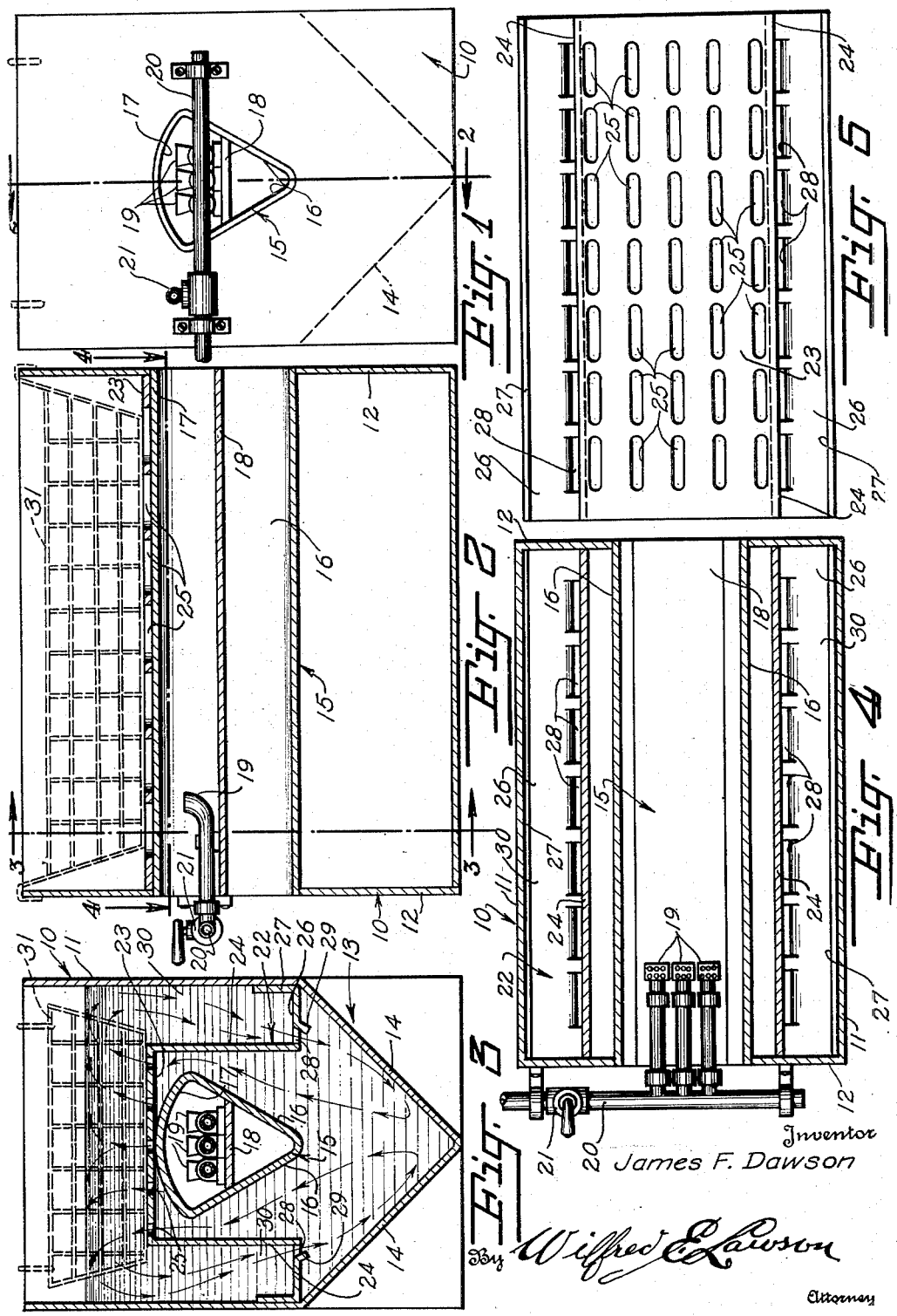
Inventor
James F. Dawson
By Wilfred E. Lawson
Attorney

Patented Dec. 26, 1950

2,535,905

UNITED STATES PATENT OFFICE 2,535,905

DEEP FAT FRYER

James F. Dawson, Houston, Tex.

Application April 30, 1946, Serial No. 666,128

3 Claims. (Cl. 99—408)

This invention relates generally to food cooking apparatus and pertains particularly to an improved deep fat fryer.

A principal object of the present invention is to provide an improved apparatus for use in deep fat frying as, for example, in the frying of oysters, French fried potatoes and the like, wherein novel means is provided for effecting the removal of bits and particles from the melted grease, continually during the use of the apparatus, whereby the food is at all times maintained in a portion of the grease which is clean and free from floating particles of food.

Another object of the invention is to provide a deep fat fryer wherein a novel receptacle construction is employed for maintaining a continuous circulation of the grease from the frying area to a low point in the receptacle, with means for cooling the grease in said lower part of the receptacle whereby to effect an automatic settling of food particles so that the grease is automatically and continuously cleansed while being used.

Still another object of the invention is to provide a deep fat fryer comprising a grease receptacle having a central passage or tunnel therethrough in which heating elements are housed, with a portion of such passage or tunnel functioning as a cool air conduit whereby grease circulating below such cool air conduit is maintained at a slightly lower temperature than the grease overlying the tunnel where the circulatory movement of the grease is slowed down slightly and particles of food are caused to settle to the bottom of the receptacle.

Other objects and advantages of the invention will become apparent as the description of the same proceeds and the invention will be best understood from a consideration of the following detailed description taken in connection with the accompanying drawing, forming a part of the specification, with the understanding, however, that the invention is not confined to a strict conformity with the showing of the drawing but may be changed or modified so long as such changes or modifications mark no material departure from the salient features of the invention as expressed in the appended claims.

In the drawing:

Figure 1 is a view in end elevation of a deep fat fryer constructed in accordance with the present invention.

Figure 2 is a vertical longitudinal section taken substantially on the line 2—2 of Figure 1.

Figure 3 is a vertical transverse section taken substantially on the line 3—3 of Figure 2.

Figure 4 is a longitudinal horizontal section taken substantially on the line 4—4 of Figure 2.

Figure 5 is a view in top plan of the removable rack which is constructed to establish desired circulation current in the grease.

Referring now more particularly to the drawing the numeral 10 generally designates a rectangular receptacle having the longitudinal side walls 11 and the end walls 12. The receptacle is open at the top as shown while the bottom which is generally designated 13, comprises two wall portions 14 which extend inwardly and downwardly from the lower edges of the side walls 11 forming, between the lower ends of the end walls 12, a V-shaped trough in the bottom of which food particles and other foreign matter are collected.

The numeral 15 generally designates a tubular body which extends longitudinally through the receptacle above the plane of the top edges of the inclined bottom wall portions 14, as clearly shown in Figure 3. This tubular body 15 is open at its two ends and such ends are mounted in suitable openings in the end walls 12 so that the body forms a tunnel completely through the receptacle and open at both ends.

The tubular body is substantially triangular in cross section, having the downwardly converging side walls 16 while the top wall is transversely arcuate as indicated at 17.

As shown in Figure 3 the apex of the angle formed between the converging side portions 16 of the tunnel lies directly above the apex of the angle formed between the portions 14 of the bottom wall and it is in substantially the same horizontal plane as the top edges of the portions 14 of the bottom wall.

Extending through the tunnel 15 is the horizontal partition wall 18 which divides the tunnel into upper and lower portions, the upper portion being designed to house a set of burners or heating units 19 while the lower portion of the conduit below the partition 18, forms an air passageway which tends to reduce conduction of heat downwardly into the lower part of the receptacle.

The burners 19 may be provided in any suitable manner with necessary fuel as, for example, by means of a supply manifold 20 mounted upon one end of the receptacle and provided with a shut-off valve 21.

The burners or heating units 19 are grouped in the tunnel 15 adjacent to one end thereof as shown so that the maximum heat is applied to the arch or top wall 17 of the tunnel at one end of the receptacle thereby causing the grease within the receptacle to not only be circulated upwardly and laterally toward the side walls, as indicated by the arrows in Figure 3, but also from the end of the receptacle adjacent to which the burners are located, toward the opposite end thereof.

The circulation of the grease in the receptacle in streams moving upwardly from the top wall 17 of the tunnel and then laterally and downwardy toward the bottom wall portions 14 to return or move back upwardly along the convergent side walls 16 of the tunnel, is produced by the removable rack structure which is generally designated 22.

As best seen in Figure 3 the rack structure is of a width to fit snugly between the side walls 11 of the receptacle and it is of a length equal to the interior length of the receptacle as shown in Figure 2. As is also clearly shown in Figure 3 the rack comprises a central bridgelike portion which is of a width slightly greater than the width of the tunnel 15 and comprises a horizontal top wall 23 and depending vertical side walls 24. The top wall 23 is provided with a plurality of openings in the form of slots 25 and such a top wall rests directly upon the domed or ached top wall 17 of the tunnel thereby positioning the depending side walls 24 in spaced relation with the sides of the tunnel leaving a space for grease to flow upwardly between the sides of the tunnel and the walls 24 to and through the openings 25.

At their lower edges the side walls 24 of the bridgelike central structure of the rack, are joined with the horizontal outwardly extending floor walls 26, each of which is bordered along its outer edge by the upturned flange 27. Such flanges 27 bear firmly against the inner sides of the receptacle side walls 11 so that, in this manner, the rack is maintained firmly in position and is prevented from rocking upon the top of the tunnel 15.

Along the inner side of each floor wall 26 is formed a longitudinally extending series of slots or openings 28 each of which is bordered at its outer edge by the downturned inwardly directed lip 29.

Since the rack structure forms a partition horizontally in the receptacle between the side and end walls and over the burner housing tunnel, it will be readily seen that when the burns are functioning to heat the grease which fills the receptacle to a level well above the top wall 23 of the rack structure, convection currents will be set up causing the grease to move upwardly from the top wall 17 of the tunnel, through the openings 25 and then outwardly toward the side walls 11 of the receptacle as shown by the arrows. The currents, then contacting the walls of the receptacle, will be deflected downwardly into the narrow passages 30 formed between the walls 11 and 24, toward the floor walls 26, passing downwardly through the slots 28 toward the downwardly converging surfaces of the bottom wall portion 14. In this manner currents flowing down from each side of the receptacle will merge at the bottom of the V-shaped bottom wall and be mutually deflected upwardly across the undersides of the convergent walls 16 of the tunnel, passing up between such walls and the walls 24 of the rack structure for reheating at the top of the tunnel.

Due to the provision of the air passageway through the tunnel below the partition wall 18 it will be seen that a zone of slightly reduced temperature will be set up in the grease between the walls 14 and 16 and food particles which may be free in the grease will be caused to settle out in the constricted lower part of the bottom wall area, as will be readily apparent.

As is well known to those versed in the art, deep fat frying is carried out by the use of slatted baskets in which the food is placed. Such a basket is shown in broken lines in Figures 2 and 3 and is designated 31. It will be seen that the horizontal wall 23 also forms a support upon which the basket 31 may rest so that the major portion of the basket will be submerged in the heated grease.

From the foregoing it will be readily apparent that there is provided in the present invention a deep fat fryer which is so designed that it will function efficiently to effect the automatic removal from the grease of loose food particles which are collected in an area a substantial distance below the heating unit, whereby such food particles are prevented from becoming burned or charred and the continually circulating grease is automatically cleansed during such circulation, whereby the food is subjected to the action of clean grease only. It will also be readily seen that the structure is of such character that it may be easily and quickly cleaned by the simple process of withdrawing the partitioning rack structure 22 whereby the V-shaped lower portion or bottom of the receptacle may be easily reached for cleaning.

I claim:

1. A deep fat fryer of the character described comprising a grease receptacle having side and end walls and an open top for the reception of a food receptacle, the grease receptacle having a bottom wall comprising downwardly convergent portions forming a substantially V-shaped structure, a tubular housing extending longitudinally through the grease receptacle and opening at its two ends through the said end walls, said tubular housing having a transversely arcuate top wall, a horizontal division wall extending lengthwise through the tubular housing dividing the same into a lower air passage and an upper heater chamber, heating means in said chamber, a rack structure forming a horizontal partition in the grease receptacle and comprising a horizontal apertured top part disposed above the tubular housing, depending imperforate side parts having spaced relation with the side walls of the grease receptacle, laterally extending floor portions integral with said depending side parts having frictional engagement at their outer edges with the side walls of the grease receptacle at the tops of the convergent wall portions, said floor portions being apertured along the inner edges thereof.

2. A deep fat fryer comprising an open top receptacle having end walls and a bottom, said bottom being in the form of a channel between the end walls and having sloping sides, means forming a tubular air passage extending longitudinally through the receptacle at a substantial elevation above the lowest part of the bottom, means forming a heater chamber above the air passage, heating means in said chamber, and a rack within the receptacle and supported above the chamber, the rack having depending side portions in spaced relation with the side walls of the receptacle and an apertured top portion overlying the heater chamber, said depending side portions of the rack forming with the adjacent side walls of the receptacle, vertical channels through which are directed convection currents set up in the fluid grease contained in the receptacle.

3. A deep fat fryer comprising a receptacle having an open top for the introduction thereinto of a food carrier, the receptacle having side and end walls and a bottom wall, the bottom wall being of V-form and extending between the end walls, means forming a tubular housing extending longitudinally through the receptacle, said housing opening at its ends through said end walls, a horizontal division wall in the housing forming a top chamber and a lower air passage, the air passage being open at its ends, said tubular housing being at a substantial elevation above the bottom wall, and a rack supported above said housing and comprising a horizontal apertured top portion on which a food receptacle may rest and depending side portions having spaced relation with the adjacent side walls of the receptacle, the rack further comprising laterally extending floor walls connected with said depending side portions and contacting the adjacent side walls of the receptacle, said floor walls being apertured adjacent to the said depending side portions.

JAMES F. DAWSON.

REFERENCES CITED

The following references are of record in the file of this patent:

UNITED STATES PATENTS

| Number | Name | Date |
| --- | --- | --- |
| 1,925,265 | Mabey | Sept. 5, 1933 |
| 2,053,568 | Levin | Sept. 8, 1936 |
| 2,182,735 | O'Dowd | Dec. 5, 1939 |
| 2,196,968 | Bemis | Apr. 16, 1940 |

FOREIGN PATENTS

| Number | Country | Date |
| --- | --- | --- |
| 462,379 | Germany | Apr. 20, 1927 |